Dec. 14, 1937. F. O. S. BLAND 2,102,506
FREEZING MEDIUM, METHOD OF PRODUCTION AND APPLICATION FOR FREEZING PURPOSES
Filed March 27, 1936

Inventor
Frederick Oliver Smith Bland
by
Bailey L Parson
Attorneys

Patented Dec. 14, 1937

2,102,506

UNITED STATES PATENT OFFICE 2,102,506

FREEZING MEDIUM, METHOD OF PRODUCTION AND APPLICATION FOR FREEZING PURPOSES

Frederick Oliver Smith Bland, Hamburg, Germany

Application March 27, 1936, Serial No. 71,328
In Great Britain February 25, 1935

4 Claims. (Cl. 99—192)

As is well known foodstuffs or other perishable articles may be preserved if they are rapidly frozen by cooling them to a temperature below 0° C. so that the activity of micro-organisms is suspended and the frozen article is then capable of being kept so that it can be stored in the chilled condition for a considerable time and may be transported over great distance without, for example, its food value or its taste being adversely affected to any material extent. The thawed material may, according to the conditions obtaining, be consumed raw, boiled, roasted or the like, and have the same taste and the same food value as the initial fresh material if freezing and thawing have been effected properly.

It is of importance, in the preservation of foodstuff by freezing it, that it should be cooled as quickly as possible to a temperature below 0° C. and preferably to or below −30° C. so as to prevent escape of the juice, and to arrest as soon as possible the activity of micro-organisms such as bacteria, fungi and the like. Such a rapid cooling can only be attained incompletely if air is used as the cooling medium because air is, as is well known, a bad conductor of heat and its specific heat is low. If, therefore, it is desired to cool foodstuff in an atmosphere of air, for example in a refrigerator or the like, it is necessary to employ a very low temperature and considerable time is occupied so that such methods are very uneconomical. The transfer of heat may be improved if a liquid is employed as the cooling medium but the number of suitable liquids available is very limited because many liquids freeze at no lower than about 0° C.; water itself would be suitable for the purpose but for this. An aqueous solution of sodium chloride having a concentration of 33% freezes at −15° C. But even a temperature of about −20° C. is too high for most purposes. Moreover ordinary salt solution or other aqueous salt solutions are unsuitable for another reason. The foodstuff, which has to be immersed in the cooling liquid, is impaired by treatment with salt solution to such an extent that it is then usually of no use for human consumption. The use of ordinary salt solutions has, therefore, been restricted mainly to the freezing of fish. The salt solution penetrates into the pores and cells of the fish. Thus, foodstuff which has been treated with ordinary salt solution loses its fresh taste and its colour is usually changed. As a result of the action of the sodium chloride on the cell-contents and its proteolytic action the properties and particularly the consistency of the frozen material is substantially changed.

Cooling liquids which remain liquid at a temperature below −20° C., and which do not noticeably impair the foodstuff or the like and especially which do not impart to it an unpleasant taste or contain salts, have hitherto not been known.

The present invention is based upon the realization that a mixture of one or more aliphatic alcohols with water is suitable as a liquid for freezing foodstuffs and other perishable articles. The mixture may contain from about 20 to about 80% of ethyl or other aliphatic alcohol; but preferably two alcohols, a multi-valent and a mono-valent alcohol, are employed. A tri-valent alcohol, preferably glycerine, is conveniently the multi-valent alcohol. The proportions by volume of the mixture are preferably from about 20 to about 40% pure glycerine, from about 25 to about 45% water, and from about 20 to about 40% ethyl alcohol. A particularly suitable mixture consists of about 32% pure glycerine, about 38% water, and about 30% ethyl alcohol.

In order to remove undesirable constituents, this mixture may be treated with an adsorptive filtering material and is preferably filtered through a filter which consists of three layers, the upper layer consisting of fuller's or similar earth, the middle of magnesium oxide, and the lower layer of active carbon, these layers being conveniently separated from one another by cloths or the like. It has proved that the most satisfactory purification of the mixture is obtained if the mixture of glycerine, water and alcohol is filtered by gravity through the aforesaid layers of filter material at a temperature of about 17° C.

The liquid freezing medium is then cooled to about −30° C. and the foodstuff or the like is immersed in it, being preferably passed through it continuously. The apparatus in which this is done may comprise a refrigerating apparatus, for example a refrigerating machine with a cold accumulator of known construction, a vessel containing a cooling liquid, for example a calcium chloride solution or the like, at about −30° C. which is maintained at such a temperature by the refrigerating apparatus, and one or more smaller vessels dipping into the cooling liquid, these smaller vessels containing the freezing medium through which the material to be frozen is conveyed.

An example of a filter for use in purifying the freezing medium and of apparatus suitable for its employment will now be described more fully with reference to the accompanying drawing, in which:—

Fig. 2 is a vertical longitudinal section of the apparatus on the line I—I of Fig. 3, while

Figure 1:
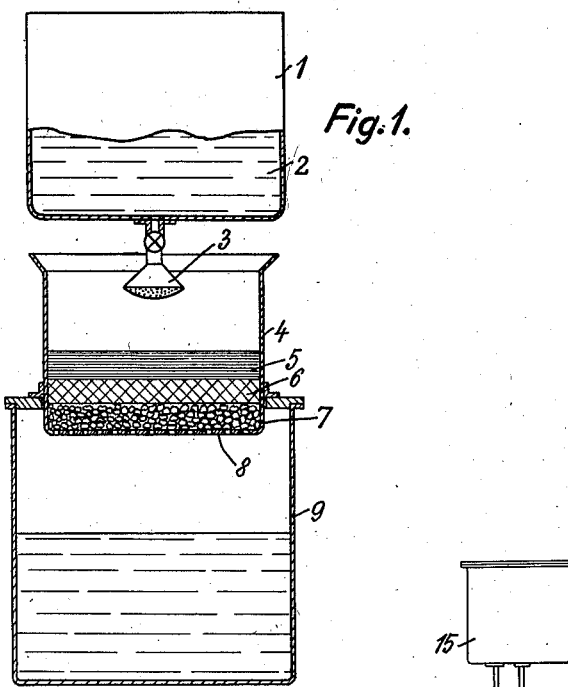
Fig. 1 is a vertical section of the filter.

Referring first to Fig. 1, the filter comprises a container 1, into which the crude freezing medium is placed as indicated at 2. The mixture which, as already stated, preferably consists of 32 parts by volume of pure glycerine, 38 parts water, and 30 parts ethyl alcohol, should first be allowed to stand in a chamber maintained at a temperature of 17° C. or a little higher so that the liquid assumes a temperature of 17° C. The freezing medium is then allowed to flow, by way of a suitable distributing device such as a rose 3, into a container 4 which is provided with three layers 5, 6, 7 of filtering material and which has a perforated bottom 8. The top layer 5 consists conveniently of fuller's earth or some other similar earth such as Florida earth or the like. The middle layer 6 consists preferably of magnesium oxide and the lower layer 7 of active carbon. This composition of filter has proved to be particularly suitable. The filter layers are preferably separated from one another and from the vessel 4 or the perforated bottom 8 by filter cloths. The filtrate flows by gravity through the filter layers 5, 6 and 7, through the perforated bottom 8 and into a vessel placed under it. It has proved that by carrying out the filtering in the manner described and at a temperature of about 17° C. the constituents which give an undesirable smell and taste to the crude liquid are substantially removed.

Figure 2:
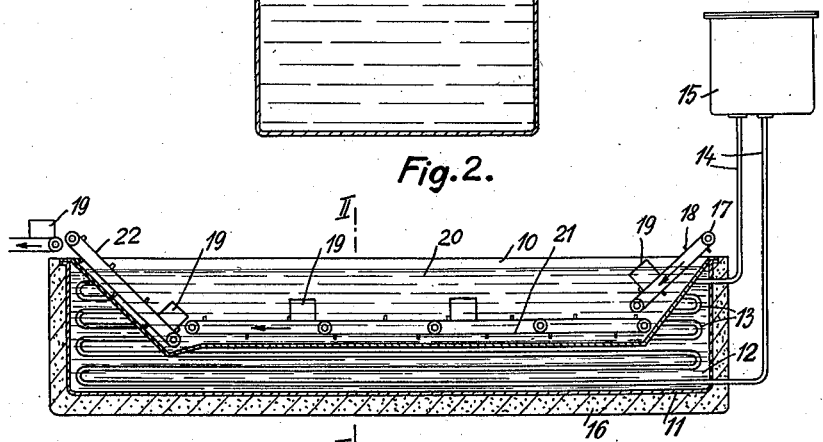
Figure 3:
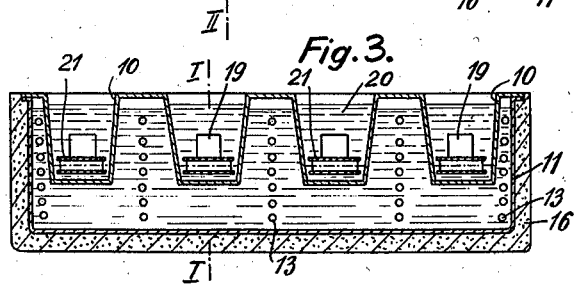
Fig. 3 is a vertical transverse section on the line II—II of Fig. 2.

The freezing medium so purified and desweetened is then ready for use in freezing foodstuff or other perishable articles, and Figs. 2 and 3 show an example of apparatus suitable for this purpose. The freezing medium is placed in the containers 10 which are made of Monel metal or some other suitable material which is not attacked by salt solutions. These containers 10 are arranged in rows in the container 11 which, for example, may consist of sheet iron or the like, the containers 10 being suspended in the cooling liquid 12 in the container 11. Serpentine pipes 13 which are connected by the pipes 14 with the refrigerating machine or the cold accumulator 15 are arranged between adjacent chilling containers 10, so that the cooling medium from the refrigerating machine or the cold accumulator flows through the tube system 13 and after abstraction of heat from the liquid 12 flows back to be cooled again in the refrigerating apparatus 15. The liquid 12 may, for example, be a solution of calcium chloride. The container 11 is preferably lagged with a layer 16 of heat insulating material, for example cork or glass wool. The containers 10 are provided with a conveyor, for example with an endless conveyor band 17, which is provided with ledges or the like 18 by means of which the articles 19 are immersed in the freezing medium 20. A second but horizontal endless conveyor band 21 moves along adjacent to the bottom of the container 10 and receives the articles 19 from the inclined conveyor band 17 and carries them along through the liquid in the container 10. At the other end of the horizontal conveyor band 21, the articles 19 are received by an inclined conveyor band 22, by means of which they are removed from the liquid in the container 10. The articles are now frozen and ready for storage or packing. A further conveyor may be provided for taking the articles from the conveyor 22 to a packing or storage department.

The cooling medium flowing from the refrigerating apparatus 15 through the tube system 13 is preferably cooled to a temperature below −30° C. It abstracts heat from the cooling liquid 12 in the container 11, which liquid in turn abstracts heat through the walls of the containers 10 from the freezing medium 20, which is in this way cooled to a temperature of about −30° C. or under. As a result the foodstuff or other articles 19 to be frozen are cooled quickly to a temperature of below −20° C.

While the freezing of fish, meat, poultry or of fruit such as strawberries and so on, took several hours according to earlier methods, freezing may be effected in a fraction of this time according to the present invention. Preservation is effected quickly and suddenly so that the activity of micro-organisms is immediately stopped and the articles to be preserved, for example meat or the like, is provided, immediately after being brought into the freezing medium 20, with a crust which prevents penetration of the freezing medium into the cells or pores. Furthermore, the cell-liquid does not pass out of the cells or fibres and separate outside the fibres as a result of which, as is well known, an undesirable dryness and unnatural quality of the frozen material would be produced after thawing. The liquid in the cells of the frozen material is on the contrary suddenly caused to solidify in them so that the material after thawing has practically the same quality as the material had before being frozen.

By arranging the liquid freezing medium in a container surrounded by some other cooling liquid from which heat is in turn abstracted by means of coils containing a cooling medium, it is possible to carry out the freezing operation with a comparatively small quantity of the liquid freezing medium; moreover, there is no likelihood of contamination of the foodstuff or other articles due, for example, to leakage from the refrigerating coils.

I claim:—

1. A method of preserving perishable foodstuff which consists in immersing said foodstuff directly in a liquid chilling medium, cooled to at least −30° C., consisting of 20 to 40% pure glycerine, 20 to 40% ethyl alcohol and 25 to 45% water, to freeze the said foodstuff rapidly.

2. A method of preserving perishable foodstuff which consists in subjecting said foodstuff directly to the action of a chilling medium cooled to at least −30° C., consisting of 20 to 40% glycerine, 20 to 40% ethyl alcohol, and 25 to 45% water, to freeze the said foodstuff rapidly.

3. A method of preserving perishable foodstuff which consists in subjecting said foodstuff directly to the action of a chilling medium cooled to at least −30° C., consisting substantially of 32% glycerine, 30% alcohol and 38% water, to freeze the said foodstuff rapidly 4. A method of preserving perishable foodstuff which consists in subjecting said foodstuff directly to the action of a chilling medium cooled to at least −30° C., consisting of a desweetened mixture consisting of 20 to 40% glycerine, 20 to 40% ethyl alcohol, and 25 to 45% water, to freeze the said foodstuff rapidly.

FREDERICK OLIVER SMITH BLAND.